May 31, 1966  R. W. TWIGG  3,253,794
TAPE WRAPPING MACHINE
Filed April 11, 1963  7 Sheets-Sheet 1
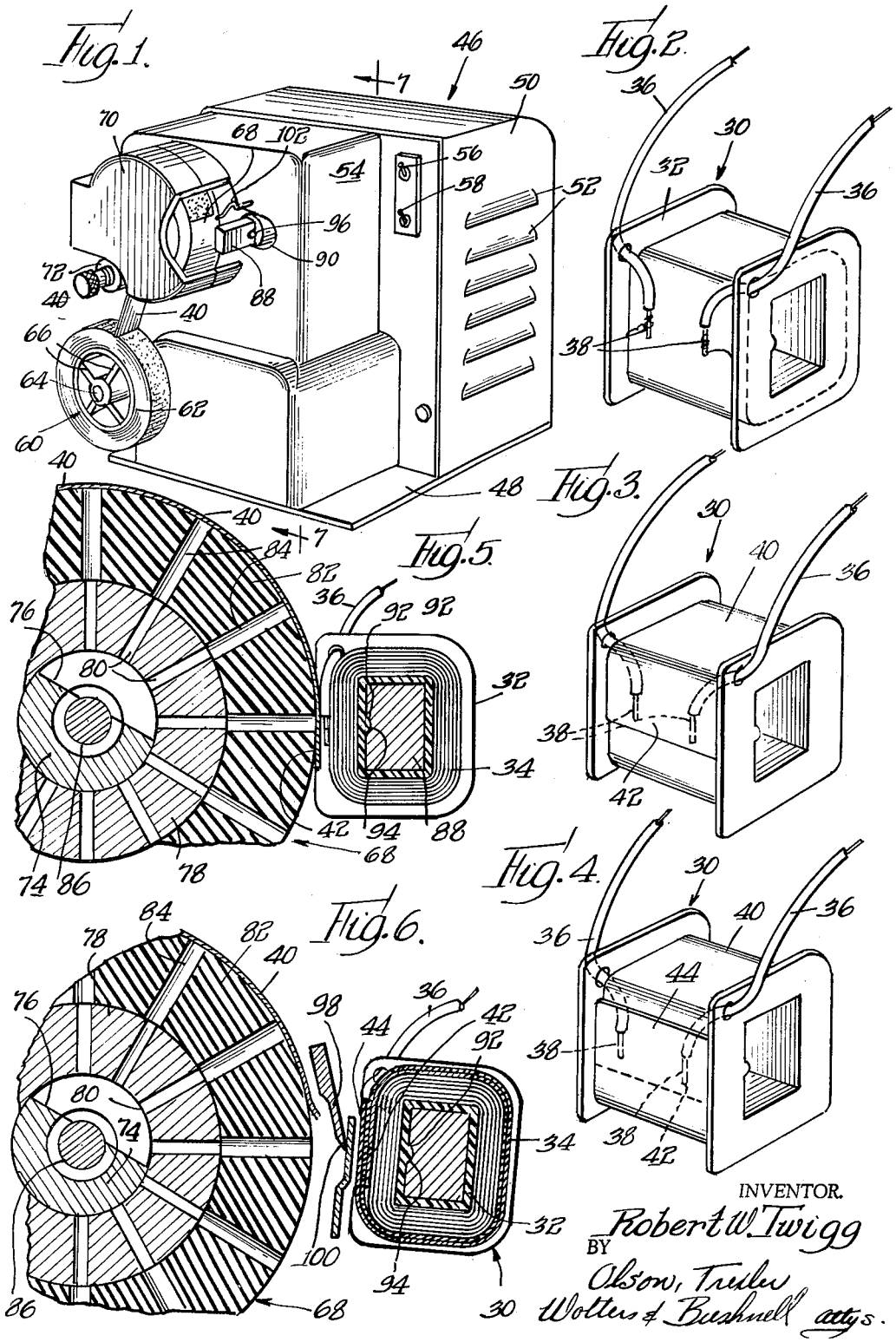
INVENTOR.
Robert W. Twigg
BY Olson, Trexler
Wolters & Bushnell attys.

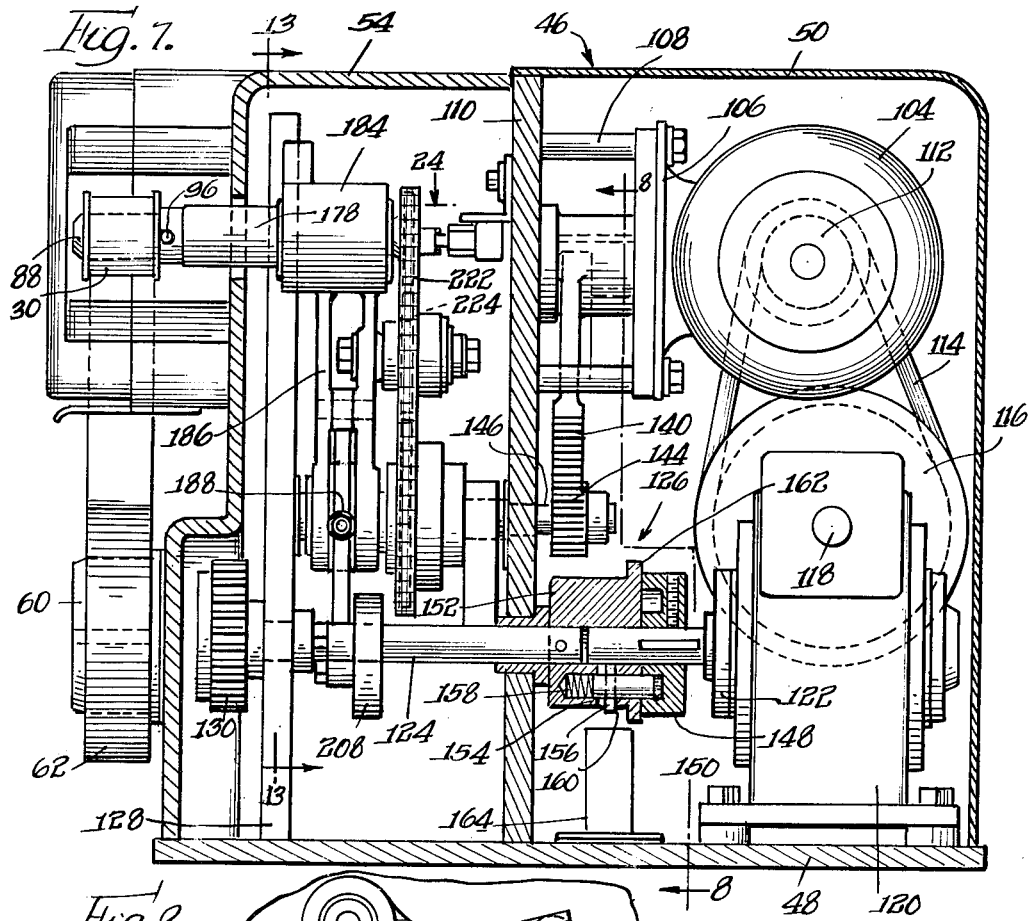
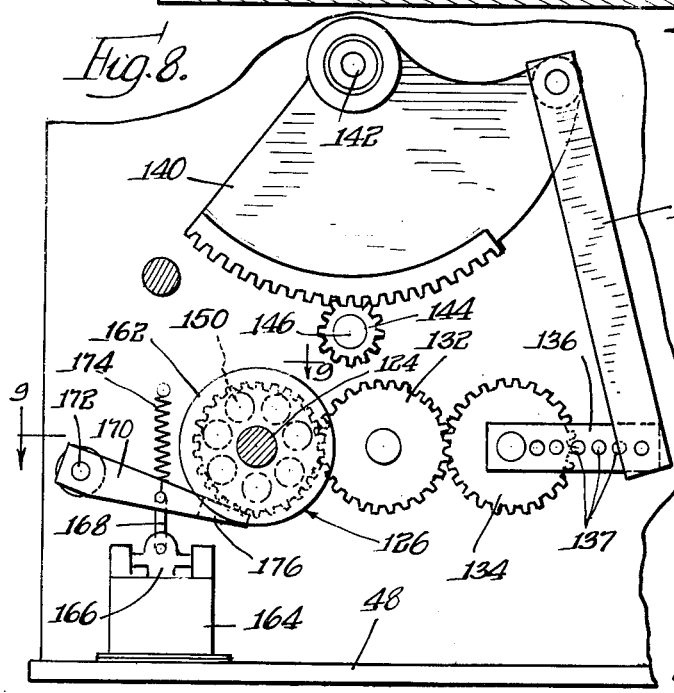
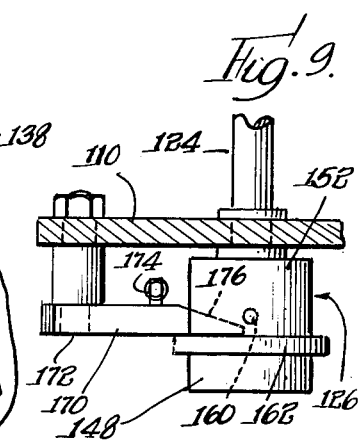

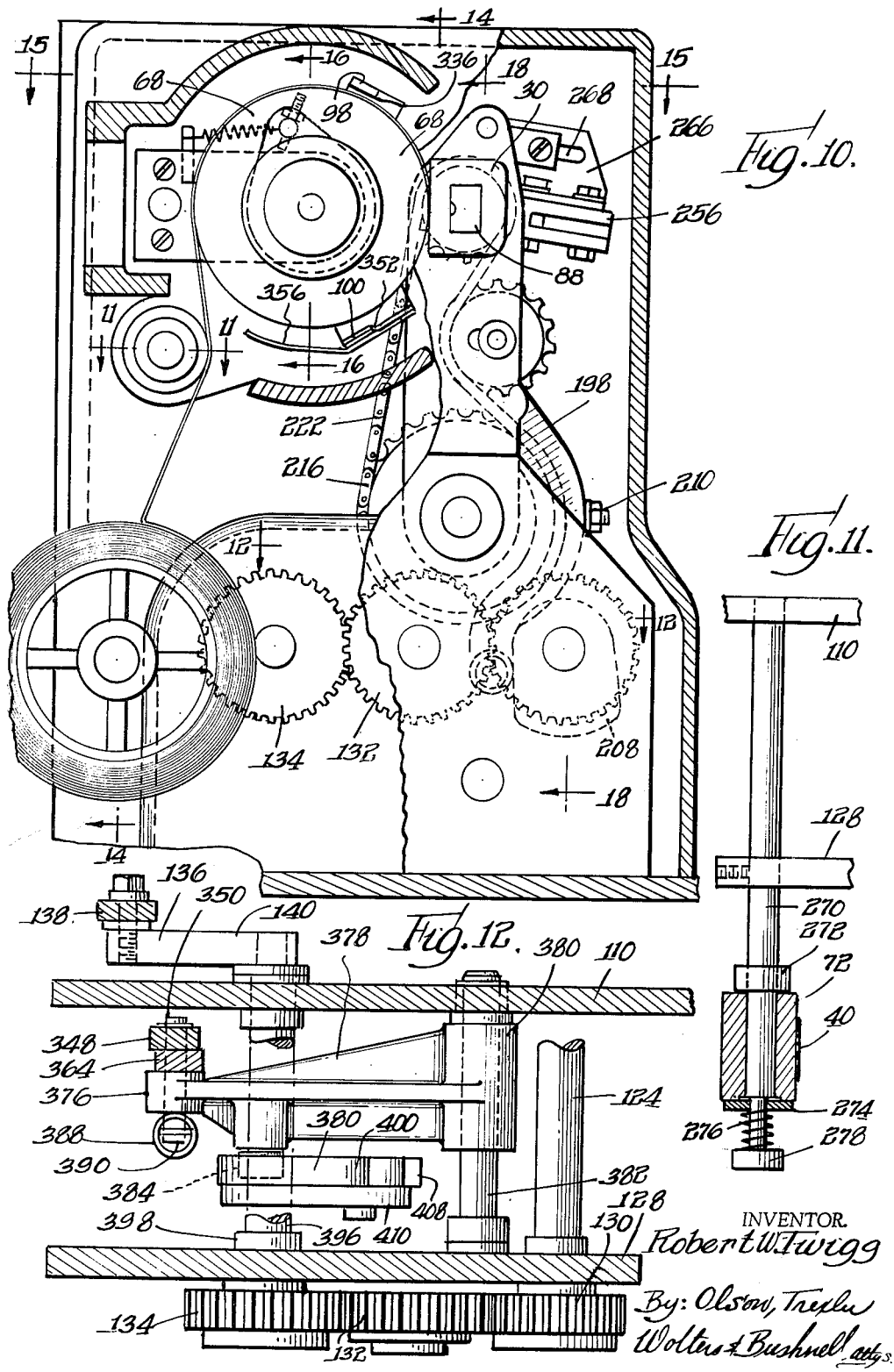

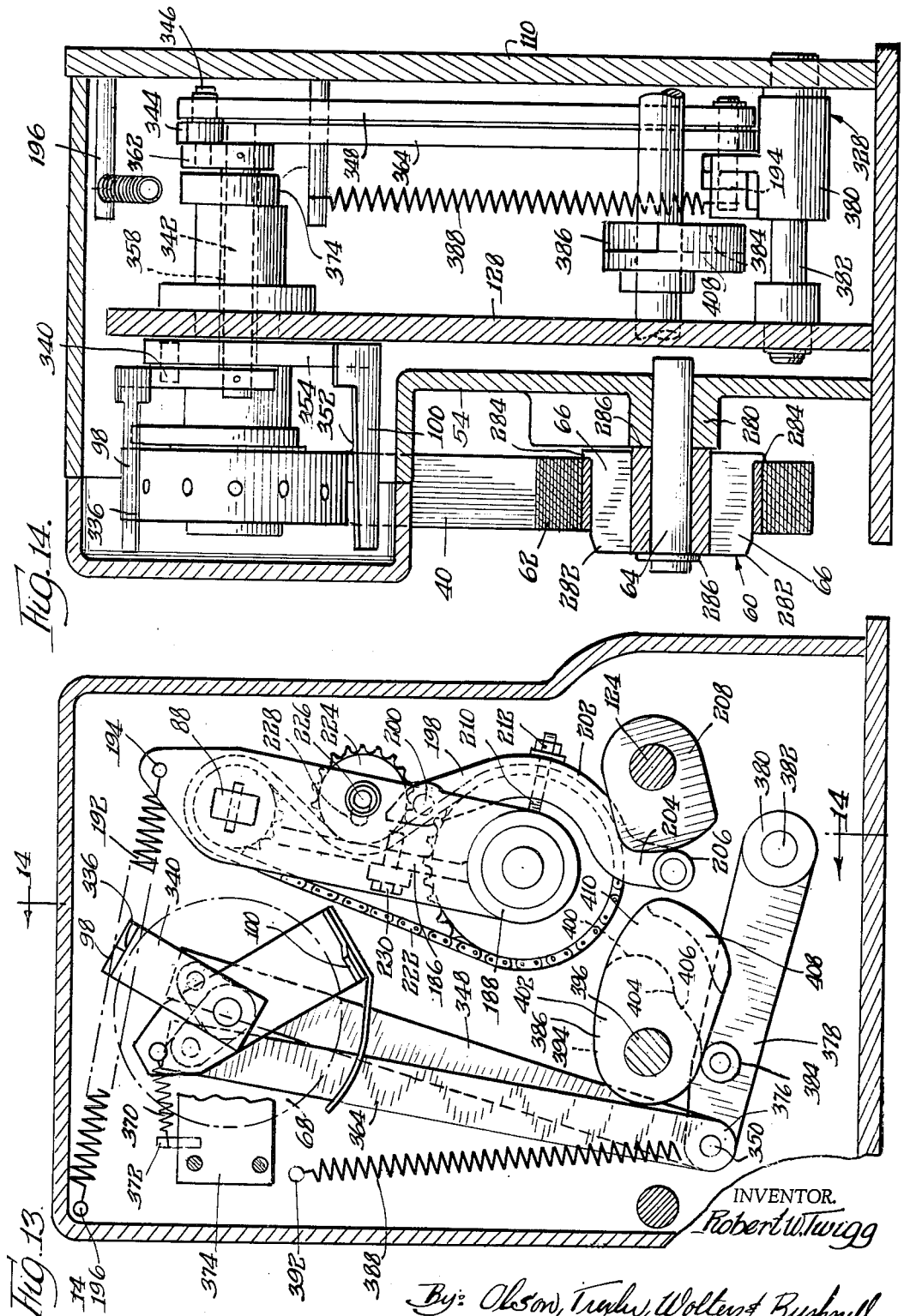

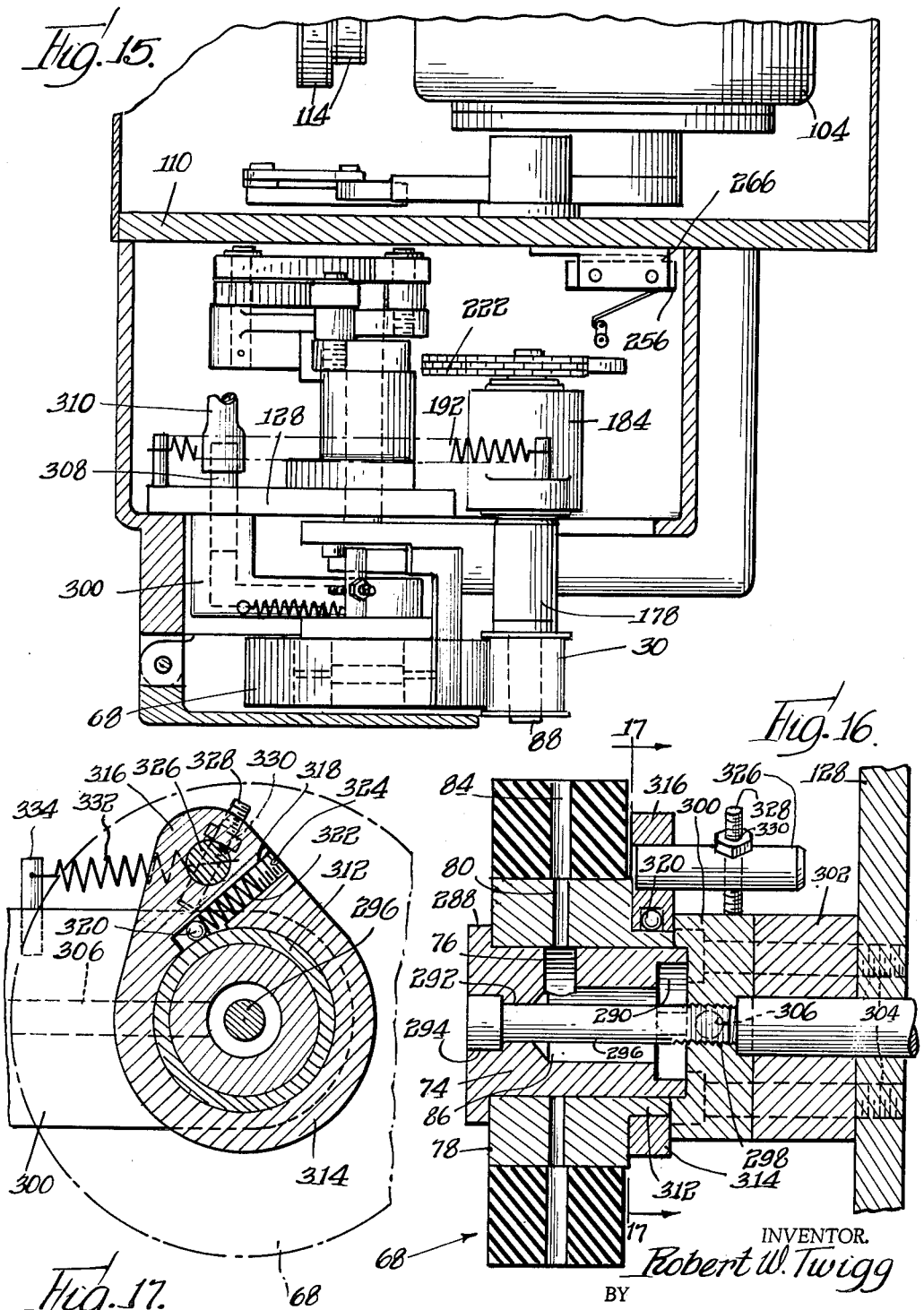

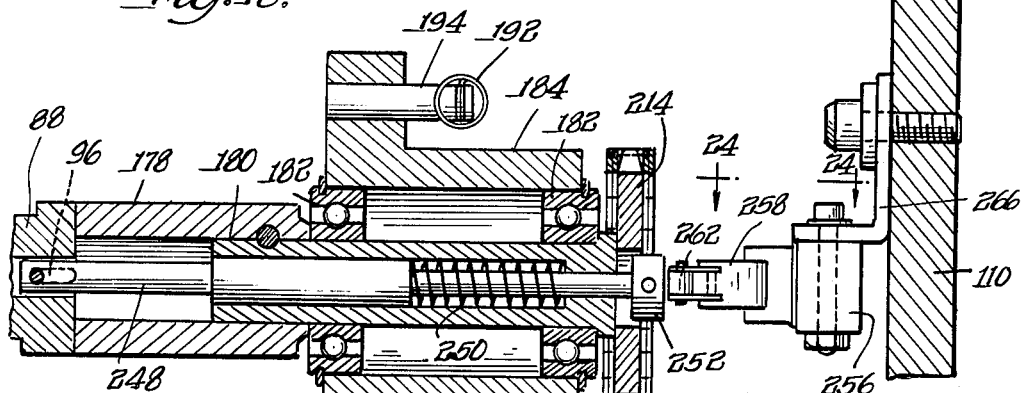
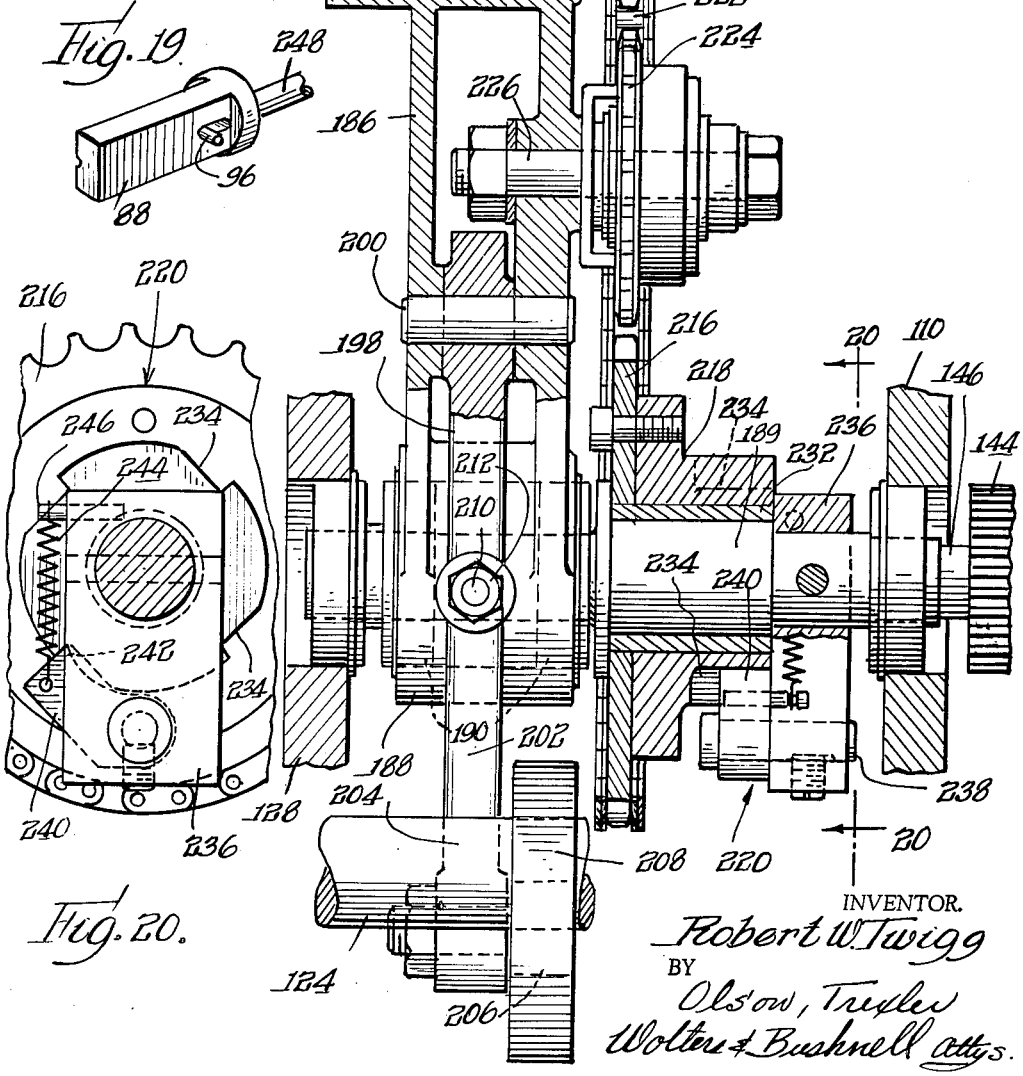

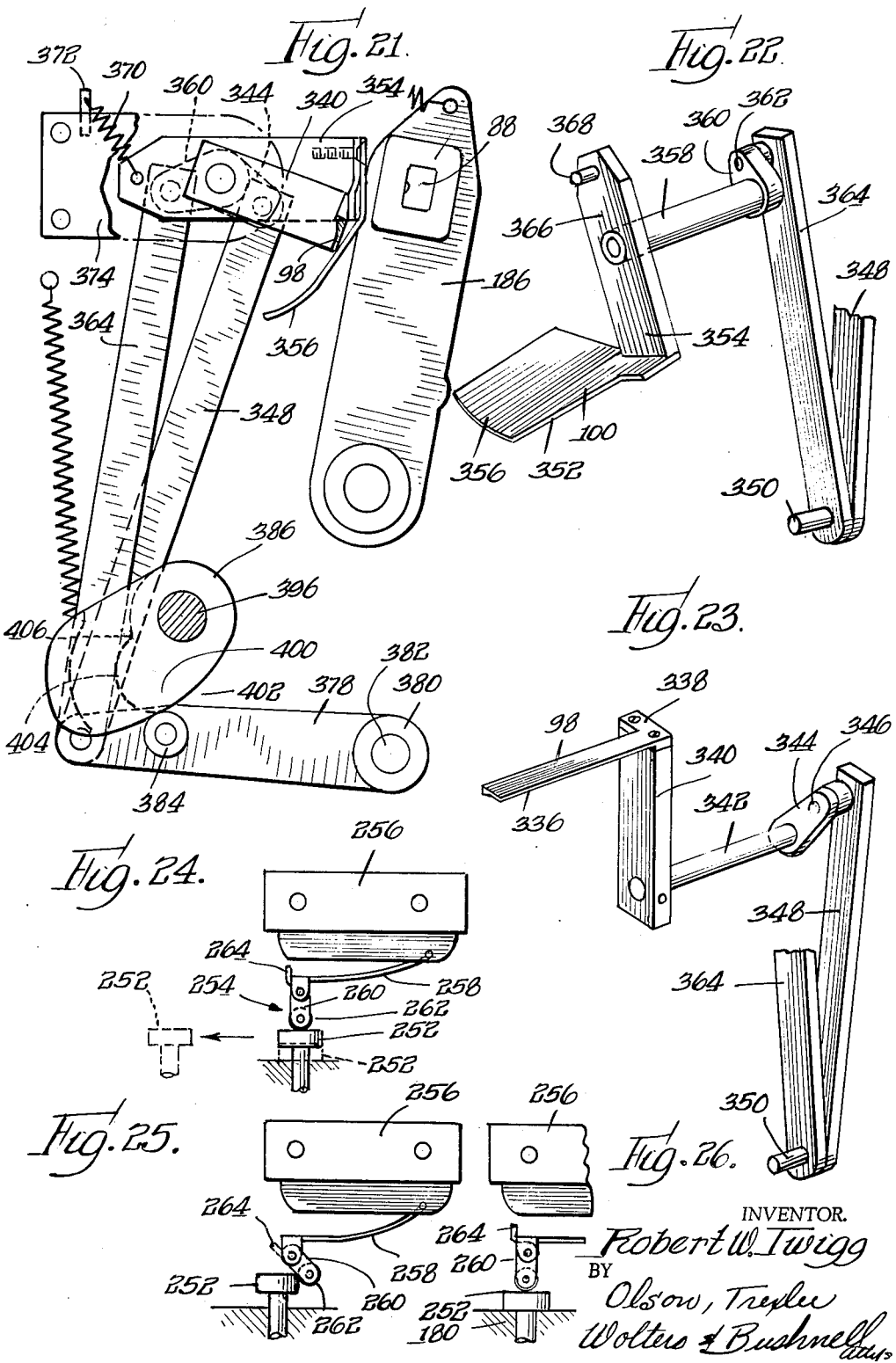

United States Patent Office 3,253,794
Patented May 31, 1966

3,253,794
TAPE WRAPPING MACHINE
Robert W. Twigg, Rockford, Ill., assignor to Midland Engineering & Machine Company, Rosemont, Ill., a corporation of Illinois
Filed Apr. 11, 1963, Ser. No. 272,276
13 Claims. (Cl. 242—10)

This invention relates to the art of manufacturing electric coils, and particularly to a machine for winding insulating tape on such coils.

It is common practice to wind electric coils for transformers, relays, solenoids and the like of enameled wire. This wire must be protected physically and electrically, and it is common practice to wind insulating tape about a coil of this nature for this purpose. Such coils are frequently provided with leads, sometimes called "pigtails." In order to meet the requirements of regulatory bodies, for example Underwriters' Laboratories, a certain thickness of tape or other insulation must overlie the connection of the leads to the coil wire. Accordingly, it is common practice to provide an overlap of tape in the vicinity of the junction of the lead wires and the coil wire.

Heretofore, it has been the practice to wind tape on electric coils by hand. Labor costs have progressed to the point where hand winding is extraordinarily expensive. Furthermore, a great deal of tape is likely to be wasted in producing an overlap. Specifically, it is common practice to provide two layers of tape over the entire coil winding, and to provide a third layer at the critical area where the lead wires are joined to the coil wire, such third layer being effected by the overlap. Although only a fraction of an inch may be lost in each winding, the cumulative effect can amount to several hundred feet in a day's production. This is costly even with inexpensive tapes and becomes a major consideration with special tapes, and even with the common tapes of the more expensive variety.

Accordingly, it is an object of this invention to provide a machine for automatically winding insulating tape on electric coils and the like.

Specifically, it is an object of this invention to provide an automatic tape winding machine capable of taping 600 to 1,000 coils per hour as compared to 100 to 300 per hour wound by hand.

It is a further object of this invention to provide such a machine in which the coil is turned a whole number of turns relative to a tape supply, and yet produces an overlap of tape.

It is a further object of this invention to provide improved tape feeding mechanism in a machine for winding tape on electric coils and the like.

It is yet another object of this invention to provide new and improved means for cutting off tape in a machine for winding tape on electric coils and the like.

It is another object of this invention to provide a tape wrapping machine which can be used in conjunction with coil winding equipment or at the "pigtail" stage.

Still another object of this invention is to provide a tape wrapping machine that can be used for taping operations additional to coil taping, such as packaging, bundling, etc.

Other and further objects and advantages will be apparent from the following description when taken in connection with the accompanying drawings wherein:

FIG. 1 is a perspective view of a tape wrapping machine constructed in accordance with the principles of the present invention;

FIG. 2 is a perspective view of a coil prior to having any tape wound thereon;

FIG. 3 is a perspective view of the coil with tape partially wrapped thereon;

FIG. 4 is a similar view with the coil completely wrapped, indicating the overlap at the area where the lead wires are attached;

FIG. 5 is a vertical sectional view on an enlarged scale taken through the coil and the adjacent portions of the wrapping machine at the start of a wrapping operation;

FIG. 6 is a view similar to FIG. 5 at the end of a tape wrapping operation;

FIG. 7 is a vertical sectional view on an enlarged scale through the wrapping machine as taken substantially along the line 7—7 in FIG. 1;

FIG. 8 is a fragmentary vertical sectional view taken substantially along the line 8—8 in FIG. 7;

FIG. 9 is a horizontal detail view taken substantially along the line 9—9 in FIG. 8 showing a solenoid controlled clutch mechanism;

FIG. 10 is a vertical view partially in section and with parts broken away showing certain of the drive mechanisms of the machine;

FIG. 11 is a detail horizontal sectional view taken along the line 11—11 in FIG. 10;

FIG. 12 is a horizontal sectional view taken substantially along the line 12—12 in FIG. 10;

FIG. 13 is a vertical sectional view as taken along the line 13—13 in FIG. 7;

FIG. 14 is a vertical sectional view at right angles to FIG. 13 and taken along the line 14—14 in FIG. 13;

FIG. 15 is a horizontal sectional view as taken substantially along the line 15—15 in FIG. 10;

FIG. 16 is an enlarged vertical sectional view as taken along the line 16—16 in FIG. 10;

FIG. 17 is a vertical sectional view taken substantially along the line 17—17 in FIG. 16;

FIG. 18 is a vertical sectional view as taken along the line 18—18 in FIG. 10;

FIG. 19 is a detail perspective view of one of the parts shown in FIG. 18;

FIG. 20 is a vertical sectional view taken along the line 20—20 in FIG. 18;

FIG. 21 is a vertical view showing certain of the parts previously shown in FIG. 13;

FIG. 22 is a perspective view of some of the parts shown in FIG. 21;

FIG. 23 is a perspective view of other of the parts shown in FIG. 21;

FIG. 24 is a somewhat simplified view of the switch mechanism shown in FIG. 15, and taken substantially along the line 24—24 in FIG. 7;

FIG. 25 is a view similar to FIG. 24 showing the switch mechanism at a different time in the sequence of operation, and FIG. 26 is a similar view taken at a later time.

Reference now should be had to the first sheet of drawings wherein a coil identified generally by the number 30 is shown in FIGS. 2-4. Referring first to FIG. 2, the coil comprises the usual form 32 including a spool having end flanges with a wire winding 34 thereon. Typically, this wire is of the type having enamel or the like insulation thereon. Terminal leads or pigtails 36 are soldered to the ends of the coil wire 34 at 38 and extend out through suitable apertures in the end flanges on the coil form or spool.

As shown in FIG. 3, a strip of insulating tape 40 is wound on the outside of the wire 34, starting at a position overlapping the soldered connections 38, as indicated at 42. The tape 40 may be wrapped about the wire any number of times, typically twice, in accordance with the requirements of the particular structure, and it is terminated in such fashion as to overlap the starting portion 42 of the tape as indicated at 44, thereby providing an extra layer of insulation in the critical area where the pigtails are soldered to the ends of the coil.

The tape may be of any usual, or even special type. Typical tapes are made of acetate, cotton, fiberglass, or vinyl, coated or impregnated with a suitable adhesive.

A machine for so winding the tape is indicated generally at 46 in FIG. 1. The machine includes a base 48 adapted to be supported on a table, workbench, or the like. It further includes a sheet metal casing or housing 50 provided with ventilating louvers 52. The machine is quite remarkably small and typical overall dimensions are 13½" from left to right (as viewed in FIG. 1), 15½" front to back, and 15½" from top to bottom. The housing includes a reduced size front portion 54, adjacent which is disposed a pair of switches 56 and 58 for operating the drive motor, and for operating a vacuum pump forming an adjunct to the machine, as will be set forth hereinafter.

A rotary support 60 extends from the front of the housing extension 54, and rotatably supports a roll of insulating wrapping tape 62. The support preferably comprises a spider rotatably mounted on a fixed stud 64, and comprising a plurality of radially extending axial blades or vanes 66. From the supply roll of tape, the tape 40 extends up over a wall or roller 68 housed within a partial cover 70. The tape 40 passes over an idler roller 72 between the roll 62 and the roller 68. The idler roller 72 is provided with a spring restraining device to afford a slight resistance to turning as will be brought out hereinafter.

As is best seen in FIGS. 5 and 6, the roller 68 is mounted on a hollow shaft 74, which is chordally relieved at 76. The chord is along the upper right portion of the shaft, as viewed in FIGS. 1, 5 and 6, and extends below the horizontal on the right, and well past the vertical on the left.

The roller 68 includes a central wheel or disc 78 having a plurality of radial bores 80 extending therethrough. An outer tire 82 which is possessed of frictional and preferably resilient qualities, conveniently rubber, is mounted on the central or inner wheel 78. Radial bores 84 of slightly larger diameter are aligned with the bores 80 and extend through the tire 82.

Vacuum is applied to the hollow center 86 of the shaft 74. As the roller 68 rotates (it is pulled along by the tape, as will appear hereinafter), successive ones of the bores 80 and 84 are subjected to the vacuum in the area of chordal relief of the shaft. Vacuum thereby is applied at the surface of the roller 68 throughout a substantial portion at the top thereof, extending from somewhat above the horizontal on the left to somewhat below the horizontal on the right, thereby securely holding the tape against the surface of the roller in this area. As will be apparent, the sticky or adhesive side of the tape is disposed radially outwards in this area.

A rotary arbor 88 projects from the front of the housing forward extension 54, the latter having an elongated slot 90 therein leading toward the roller 68 for permitting movement of the arbor toward and away from the roller 68. In the embodiment illustrated, the arbor is rectangular in cross section, and is provided with a longitudinal groove 92 (FIG. 5) along one side. The coil form 32 is of complementary size and shape, and is provided with an internal longitudinal protuberance 94 cooperable with the groove 92 properly to orient the coil relative to the arbor. The arbor normally is spaced away from the roller 68 until such time as the coil is placed thereon. A radially extending pin 96 near the base of the arbor is engaged by the coil when it is slipped into place. This pin operates through a mechanism hereinafter to be described to operate a switch to initiate a cycle of operation including movement of the arbor toward the roller 68 to place the leading end of the tape against the coil and over the soldered lead connections at 38 in the position previously described.

As also will be brought out hereinafter, the arbor rotates in a counter-clockwise direction through a predetermined number of revolutions, whereby to wrap the tape on to the coil, as shown in FIG. 6. At the completion of the winding operation, knives 98 and 100 cooperate in a manner hereinafter to be set forth to cut off the wrapped tape. In order to prevent the pigtails 36 from becoming entangled with the tape during the wrapping operation, a wire guide 102 is provided above the arbor 88.

Reference now should be had to FIG. 7 wherein there will be seen an electric motor 104 mounted on a bracket 106 supported by studs and spacers 108 from a vertical wall or frame member 110. This motor is provided with a pulley 112 driving a belt 114, which in turn drives a pulley 116 on the input shaft 118 of a gear reducer 120 mounted on the base 48. The gear reducer is provided with an output shaft 122 which drives a shaft 124 through a clutch 126. The shaft 124 is journalled in the wall or frame member 110, and also in a front wall or frame member 128, and carries on its front end a gear 130.

The gear 130 meshes with and drives an idler gear 132, and this in turn drives a gear 134. The gear 134 has a crank arm 136 fixed on a common shaft therewith, and this crank arm is connected through a connecting rod 138 to a gear segment 140 pivoted on a stub shaft 142 to rock the segment 140 back and forth once for each rotation of the gear 134. The crank arm 136 is provided with a plurality of apertures 137 spaced longitudinally of the arm. Accordingly, the connecting rod 138 can be pivotally connected to the crank arm at radially different distances, whereby to predetermine the degree of arc through which the segment 140 will rock. This determines the degree of rotation of the arbor 88 as will be brought out hereinafter.

The segment 140 meshes with a pinion 144 and drives the pinion first in one direction, and then in the other. The pinion is fixed on a shaft 146 and more will be said about this shortly hereinafter.

The clutch 126 is shown in FIGS. 7–9. It includes a driving clutch member 148 keyed to the gear reducer output shaft 122. The driving clutch member is provided on the face thereof away from the gear reducer with an annular series of axial recesses 150.

A driven clutch member 152 is fixed on the end of the shaft 124, and is rotatable about the extending end of the shaft 122. The driven clutch member 152 is of considerable axial extent, and is provided with an eccentric axial bore 154 in which a bolt 156 is received.

The bolt is urged outwardly of the driven clutch member 122 toward the driving clutch member 148 by a helical spring 158 received within the bore 154. The bolt 156 is provided with a radially extending pin 160 which projects outwardly beyond the adjacent portion of the driven clutch member through an axial slot therein. The pin 160 is spaced from an annular ring or collar 162 on the driven clutch member. The spring 158 tends to urge the bolt 156 into one of the recesses 150.

A solenoid 164 is mounted on the base 48 adjacent the clutch 126. The solenoid plunger 166 is connected by means of a connecting rod 168 to substantially a midpoint of a lever 170 pivoted at one end at 172, and urged upwards by a tension spring 174. The outer end of the lever is disposed adjacent the collar 162 of the driven clutch member, and the back side thereof is tapered or provided with a cam ramp 176 as shown in FIG. 9. The spring 174 normally holds the outer end of the lever 170 against the periphery of the driven clutch member 152 with the ramp 176 in position to intercept the pin 160. Hence, the lever normally holds the pin 160 away from the collar 162, whereby the bolt 156 is held in retracted position. Thus, the driving clutch member 148 rotates at all times when the switch 56 is in the "on" position, but is ineffective to drive the driven clutch member 152. When the solenoid 164 is energized in a manner hereinafter set forth, the solenoid retracts the lever 170 from the periphery of the driven clutch member 152, thereby freeing the bolt 156 for entry into the next driving clutch member recess 150, under the influence of the spring 158. This starts the shaft 124 in rotation.

The solenoid 164 remains energized only briefly, and the spring 174 thereafter pulls the outer end of the lever in against the periphery of the driven clutch member. The ramp 176 thus intercepts the pin 160 the next time around. The pin rides up the ramp and retracts the bolt from the driving clutch member, whereupon the shaft 124 stops while the driving clutch member continues to rotate. The arbor 88 is fixed to the front end of a sleeve 178 (FIGS. 7, 15 and 18) fixed to the extending end 180 of a hollow shaft journalled by ball bearings 182 in the boss 184 of an arm 186 of somewhat skeletal construction mounted for rocking movement by a boss 188 about a shaft 189. The boss 188 preferably is mounted by means of ball bearings 190. A spring 192 (see also FIGS. 13 and 14) is stretched between a pin 194 on the boss 184 and a fixed pin 196 whereby to urge the arm 186 in a counter-clockwise direction as viewed in FIG. 13, thereby resiliently to bias the arbor 88 toward the roller 68.

Means is provided to pivot the arm 186 against the force of the spring 192. Such means comprises a cam follower arm 198 pivotally mounted at 200 (FIG. 13) on the arm 186. The arm 198 is provided with a bight portion 202 to clear the boss 188, and has an end 204 extending below the boss 188 and provided with a cam follower roller 206. The roller 206 is held against the cam 208 by the spring 192.

A set screw 210 is threaded through the bight 202 and engages the boss 188. A jam nut 212 is provided on the screw 210 to lock the screw in place. The limits between which the arm 186 rocks under the influence of the cam 208 are adjustable by adjusting the set screw 210.

The cam 208 is fixed on the shaft 124. With the shaft in rest position, the cam holds the parts in the position shown in FIG. 13 with the arbor 88 retracted away from the roller 68. Upon rotation of the shaft 124, the arbor is allowed rapidly to rock toward the roller 68. Toward the end of a revolution, the arbor is equally quickly retracted away from the roller. As will be recalled, the shaft 124 makes only one revolution for each tape winding cycle.

The hollow shaft 180 is provided at its inner end with a sprocket 214. A drive sprocket 216 is fixed to a driven clutch member 218 (FIG. 18) of a clutch 220 on the shaft 189. A chain 222 passes over the sprockets 214 and 216 whereby to drive the sprocket 214 from the sprocket 216.

An idler sprocket 224 also engages the chain 222. The idler sprocket is mounted by structure including a shaft 226 in a slot 228 (FIG. 13) in one portion of the skeletal arm 186 supporting the arbor 88. A set screw and jam nut arrangement 230 is provided for pulling the idler sprocket 224 against the chain 222 to maintain the chain tight.

As will be recalled, the pinion 144 and shaft 146 are rotated first in one direction and then in the other upon rocking back and forth of the segment 140. It is desired that the arbor should turn only in one direction. Hence, the clutch 220 is provided, and is a one-way clutch. The driven clutch member 218 is provided with a hub 232 having a series of peripherally disposed notches 234 therein.

The clutch 220 also comprises a driving clutch member 236 in the nature of an arm or bar fixed to the shaft 146. A pivot pin 238 is secured in this arm outwardly of the hub 232, and a pawl 240 is pivoted thereon, with a point 242 biased toward the notches 234 by a spring 244 stretched between the pawl and a fixed pin 246 at the other end of the arm 236. As will be recognized, the clutch 220 therefore is in the nature of a pawl and ratchet clutch.

Returning to the top of FIG. 18, the pin 96 which protrudes from the side of the arbor is mounted on a push rod 248 axially movable within the hollow shaft 180. A spring 250 encircles the reduced diameter portion of the push rod 248 and urges it and the pin 96 outwardly.

The inner end of the push rod 248 is provided with an enlarged head 252, partially recessed within a counterbore of the sprocket 214, and engageable with the switch arm operator 254 to operate a switch 256. The switch is provided with a switch arm 258 disposed transversely of the push rod 248. An arm 260 projects from the arm 258 toward the head 252, and is provided with a roller 262 at the outer end thereof. The arm 260 is pivotally mounted and is capable of limited pivotal movement in a counter-clockwise direction. A projection 264 on the arm limits movement in a clockwise direction, and a coil spring (not shown) coiled about the pivot holds the arm 260 against this limit stop.

In FIG. 24, the push rod head 252 is shown in dashed lines in the position it assumes in the absence of a coil on the arbor. When a coil is pushed on the arbor 88, it engages the pin 96 (FIGS. 1, 18 and 19) to force the push rod 248 toward the switch 256. The push rod head 252 thus moves from the broken line position of FIG. 24 to the solid line position, engaging the roller 262 of the switch operator 254, and deflecting the switch arm 258. The switch 256 thus is closed and acts through suitable electric wiring (not shown) to energize the solenoid 164 (FIGS. 7 and 8) to cause the clutch 126 to engage in the manner previously described. The cam 208 then rocks the arm 186 and arbor 88 toward the roller 68. This moves the head 252 to the left-most broken line position shown in FIG. 24, thereby freeing the switch operator 254 and switch arm 258 to effect opening of the switch 256. However, as previously explained, the clutch 126 remains engaged for one complete revolution.

At the end of one revolution of the shaft 124, the clutch is opened, and the cam 208 returns the arbor to its normal position. The corresponding switch operator position is shown in FIG. 25. The head 252 engages the roller 262 from the side, and pivots the arm 260 in a counter-clockwise direction. The switch arm 258 is not deflected, and the switch remains open.

Subsequently, when the coil is removed from the arbor, the pin 96 is freed, and the string 250 moves the push rod 248 back to the left (as viewed in FIG. 18). The head 252 thereby is retracted to the position shown in FIG. 26, and the arm 260 returns under the force of its biasing spring to its normal position, whereby the switch is conditioned for a subsequent closure thereof.

The switch 256 is mounted by a right angle bracket 266 (FIGS. 10, 15 and 18) and suitable bolts to the frame member or wall 110. As may be seen in FIG. 10, the bolts which are threaded into the wall 110 pass through an elongated slot 268 in the adjacent flange of the bracket 266 to permit adjustment of the switch toward and away from the roller 68. As will be appreciated, such adjustment is made at the same time the set screw 210 is adjusted to determine the position of the arbor relative to the roller 68. This is done to accommodate coils of different diameters, as will be understood.

Details of some of the parts previously referred to are set forth immediately hereinafter. Thus, with reference to FIG. 11, the tape idler roller 72 will be seen to be mounted on a shaft 270 fixed in the plates or frame members 110 and 128. A collar 272 is fixed on the shaft, and the roller 72 is urged axially against this collar by a washer 274 which is biased by a helical spring 276 encircling the shank of and trapped beneath the head of a screw 278 threaded into the end of the shaft 270. The adhesive side of the tape passes over the surface of the roller 72, and it will be appreciated that it is undesirable for the adhesive to stick too tightly to the roller. Hence, a metal or the like roller has been found to be satisfactory.

A certain amount of adhesion to the roller is desirable, and the resilient axial clamping of the roller puts a drag on the tape to prevent undesirable "free-wheeling" thereof. The drag is readily adjustable by threading the screw 278 in or out, and to facilitate this, the screw head is of rather large diameter, and preferably is peripherally knurled.

The rotary support 60 for the tape supply 62 previously has been described in some detail. As will be seen in somewhat further detail in FIG. 14, the shaft 64 on which this support is mounted is fixed in a boss 280 in the forwardly extending housing portion 54. The blades or vanes 66 which support the tape spool 62 will be seen to have rounded noses 282, facilitating placement of the tape spool thereover. Radial extensions or stops 284 are provided at the inner ends of the vanes to limit the position of installation of the tape roll or spool. As will be appreciated, the vanes afford a tight fit for the tape roll, allowing relatively easy installation thereof as compared to a solid or cylindrical mount, while holding the tape roll sufficiently aggressively to prevent accidental removal thereof. Snap rings 286 position the rotary support 60 on the shaft 64.

The construction and mounting of the vacuum backup roller 68 are shown in somewhat greater detail in FIGS. 15–17. The shaft 74 on which the vacuum backup wheel turns is in the nature of a block having a head flange 288 thereon for retaining the backup roller 68 in place. The block or shaft 74 is provided with an axial bore 86, previously mentioned, which is counter-bored at 290 at the inner end. The outer end of the shaft or block 74 has a reduced diameter axial bore 292 which is counter-bored at 294. A bolt 296, preferably of the variety having a recessed driving structure in the head thereof, extends through the bore 292 and through the bore 86, and is threadedly received at 298 in a block 300 spaced from the wall 128 by a spacer 302 and secured to this wall by bolts 304. The block 300 is provided with a bore 306 communicating adjacent the bolt 296 with the counterbore 290 of the block or shaft 74. The bore 306 is connected by a suitable fitting 308 to a vacuum line 310 (FIG. 15). The vacuum line is connected to any suitable source of vacuum (not shown).

It will be observed in FIG. 16 that the chordal recess 76 is of limited axial extent, but more than sufficient to encompass the radial bores 80.

The central portion 78 of the vacuum backup roller 68 is provided on its back side with an axially extending hub 312 of reduced diameter. A rotation controlling fitting 314 in the nature of a clutch or brake is journalled on this hub, and is generally circular in shape with a lump or projection 316 extending radially therefrom. The fitting 314 is provided with a bore 318 which tangentially intercepts the hub 312.

A ball 320 is urged toward the inner end of this bore by a spring 322 compressed beneath a set screw 324 threaded into the outer end of the bore.

A post or peg 326 is fixed in the projection 316 of the fitting 314 and extends axially therefrom away from the roller 86. A positioning screw 328 extends diametrically through the peg 326 and is provided with a jam nut 330. The screw 328 is substantially tangential to the hub 312, and engages the top of the block 300. A spring 332 is stretched between the peg 326 and a pin 334 fixed in the top of the block 300, whereby resiliently to urge the lower end of the screw 328 against the top of the block 300.

The rotation controlling fitting 314 and appurtenances thereto will be seen to act as a one-way clutch or brake. The roller 68 cannot turn in a counter-clockwise direction, since any movement tending in this direction wedges the ball 320 into locking position against the hub 312. This prevents inadvertent backup of the tape. On the other hand, rotation of the roller 68 in a clockwise direction is permitted as the roller is pulled along by the tape when it is wound on a coil. Completely free rotation is not desired, since this might allow "free-wheeling" or overshooting of the tape, although this is rather well controlled by the idler roller 72. The ball 320 if under sufficient pressure from the spring 322 provides a certain amount of resistance to turning of the backup roller, and further controlled resistance can be provided by predetermining the fit of the fitting 314 about the hub 312.

Mechanism is provided for automatically severing the tape at the conclusion of a wrapping operation. Knives 98 and 100 previously have been mentioned briefly, and the complete mechanism including these knives is shown in FIGS. 10, 12, 13, 14 and 21–23. The knife 98 comprises an inside knife having a lower cutting edge 336. This knife is elongated in a direction substantially parallel to the arbor 88, and also parallel to the axis of the roller 68 about which both knives are arcuately movable. The inner knife 98 has a base 338 at one end secured as by screws to the end of a conveniently rectangular mounting block 340. The opposite end of the mounting block 340 is fixed to the end of a rock shaft 342. The opposite end of the rock shaft 342 has a crank 344 fixed thereon. The outer end of the crank is pivotally connected by a crank pin 346 to a connecting rod 348. The lower end of the connecting rod receives a pivot pin 350, and the connection of this will be set forth shortly hereinafter.

It will be observed that the inner knife 98 is shown in FIG. 10 in a raised position above the center line between the backup roller 68 and the arbor 88. The knife in FIG. 23 is also shown in a raised position, and with the knife in this position, the crank 344 extends up and to the right. Hence, when the connecting rod 348 is pulled down, the knife 98 is pivoted in a clockwise direction to the position shown in FIG. 21.

The knife 100 comprises an outer knife, and it has a cutting edge 352 along one edge thereof. The knife 352 is elongated in the same direction as the knife 98, and is secured at a corresponding end to a knife mounting block 354. The block 354 and knife 100 pivot in a counter-clockwise direction to effect a cutting operation, and the cutting edge 352 is skewed somewhat so that the portion nearest the block 354 is the first portion to cooperate with the inner knife 98, while progressively more remote portions from the block 354 successively cooperate with the inner knife 98 to produce a scissors-like cutting action. The scissors-like action is augmented by fabricating the outer knife of spring steel with an initial set in it so that it flexes upon progressive cooperation with the inner knife.

The outer knife is provided with an overlying shield 356 of generally arcuate shape which overlies the inner knife 98 in the position shown in FIG. 21, whereby the cutting edge of the inner knife is covered when a coil is loaded on to the arbor 88, thereby to protect the operator.

The knife mounting block 354 is fixed on one end of a hollow rock shaft 358 which is concentric with and rotatable relative to the rock shaft 342. A crank 360 extends to the left, and up with the parts in the position shown in FIG. 22, said crank being fixed on the opposite end of the hollow rock shaft 358. The crank 360 is pivotally connected by a crank pin 362 to the upper end of a connecting rod 364. This connecting rod is pivotally connnected at its lower end to the pivot pin 350 previously mentioned.

The outer knife mounting block 354 is provided with a tail 366 extending away from the knife 100, and having a pin 368 fixed thereon. A spring 370 is stretched between the pin 368 and a fixed pin 372 in a mounting block 374. The mounting block 374 is suitably secured to the frame of the machine, and journalled on the hollow shaft 358, the rock shaft 342 being journalled within the rock shaft 358. The spring urges the outer knife toward its retracted position as shown in FIG. 10.

The pivot pin 350 is fixed to the outer end 376 of a cam follower lever 378. The opposite end of the lever 378 is provided with a rather wide journal 380 pivotally received on a shaft 382 extending between the walls or frame members 110 and 124. Intermediate the ends of the lever 378 and relatively toward the outer end 376, there is mounted a cam follower roller 384.

The cam follower engages the lower edge of a cam 386, being held against the cam by a spring 388 stretched between an extending end 390 on the end of the pin 350 and a fixed pin 392. The cam is fixed by a cross pin 394 on a shaft 396 on which the gear 134 is fixed. The shaft 396 is journalled in a suitable bearing 398 in the front wall or frame member 128.

The cam 386 is substantially circular throughout the majority of its circumference but is provided with a high spot or lobe 400. The cam rises rather rapidly at 402 leading into the lobe, and drops off even more rapidly at 404 to a point of inflection 406. The cam is provided with an outrider or controlling surface 408 opposite the trailing portion of the lobe, and particularly the dropoff 404 and point of inflection 406 to insure proper following of the cam surface by the roller 384. The outrider or controlling surface 408 is mounted on a flange 410 extending out from the cam as will be understood.

At the start of a coil wrapping operation, the roller 384 is on the lobe 400 of the cam 386, substantially as shown in FIG. 21. As described heretofore, insertion of a coil on the arbor closes the switch 256 to engage the clutch 126 and thereby to start a cycle of operation. During approximately the first one-quarter revolution of the cam 386, the roller 384 drops off of the lobe 400. Both connecting rods 348 and 364 are thereby raised and act through the connecting structure previously described to raise the inner knife and lower the outer knife to the position shown in FIG. 13. In this position, the spring 370 has passed through a dead center, and is again tensioned.

After the knives separate to the position shown in FIG. 13, the cam 208 rocks the arbor toward the vacuum backup roller 68 and places the side of the coil against the adhesive side of the tape. The segment 140 and pinion 144 arrangement then operates to turn the arbor and the coil thereon through a predetermined number of revolutions. The cam 386 then moves the knives back to the position shown in FIG. 21, cutting off the tape, and the cam 208 then returns the arbor to its last position away from the vacuum backup roller 68. The inner knife in cooperating with the outer knife to cut off the tape carries the cut-off end of the tape ahead a predetermined distance, conveniently ⅜″, whereby the leading edge of the tape is below the cut-off level. This producess the overlap of tape previously described in the critical area on the coil. The amount of overlap is quite accurately predetermined, and there is, hence, at all times, insured an adequate overlap without wastage of tape such as is necessary with hand wrapping to insure an adequate overlap. The number of revolutions of the arbor is adjustable in one-half revolution steps by moving the connecting rod 138 from one to another of the crank holes 136.

The machine has been shown as adapted for hand loading with coils having central apertures which can be mounted on an arbor. Rather than an arbor, a tail stock arrangement can be used for wrapping objects which do not have a central opening. Further, the machine can be adapted automatically to receive coils from a coil winding machine, or can be built as a functional part of a coil winding machine.

Thus, it will be understood that the specific embodiment of the invention herein shown and described is for illustrative purposes only. Various changes in structure will, no doubt, occur to those skilled in the art, and will be understood as forming a part of the present invention insofar as they fall within the spirit and scope of the appended claims.

This invention is claimed as follows:

1. A machine for wrapping tape on an object, comprising frame means, means supported from said frame means for holding an object to be wrapped in a predetermined oriented position with respect to the tape to be wrapped around said object, means for supporting a supply of tape from said frame means, said tape having an adhesive surface thereon, a roller disposed adjacent said object holding means and supported from said frame means, said tape passing from said supply supporting means over said roller with the tape adhesive surface out, means for relatively shifting said object holding means laterally toward and away from said roller in a substantially lineal path to impinge said object against and to remove said object from the adhesive surface of said tape, means for rotating said holding means a predetermined integral number of half revolutions, means supported from said frame means for severing said tape to produce a predetermined amount of tape overlap in addition to the amount of tape rotated about said holding means, said tape being severed between said object and said roller at the end of a wrapping operation, and for advancing the severed end of the tape relative to said holding means whereby to provide an overlap of tape on a subsequent object, and drive means operatively connected to operate said rotating means, said lateral shifting means and said severing and advancing means in proper time relation.

2. A machine for wrapping tape on an object, comprising frame means, means supported from said frame means for holding an object to be wrapped in a predetermined oriented position, means for supporting a supply of tape from said frame means, said tape having an adhesive surface thereon, a roller disposed adjacent said object holding means and supported from said frame means, said tape passing from said supply supporting means over said roller with the tape adhesive surface out, means for establishing a differential of fluid pressure across the tape in engagement with the roller to hold the tape against the roller, means for relatively shifting said object holding means laterally toward and away from said roller in a substantially lineal manner to impinge said object against the adhesive surface of said tape, means for rotating said holding means a precisely predetermined number of degrees, said degrees being more than about 360 degrees and less than about 540 degrees, and means for varying the rotation in integral multiples of 180 degrees, means supported from said frame means for severing said tape between said object and said roller at the end of a wrapping operation, and for advancing the severed end of the tape relative to said holding means whereby to provide an overlap of tape on a subsequent object and drive means operatively connected to operate said rotating means, said lateral shifting means and said severing and advancing means in proper time relation.

3. A machine for wrapping tape on an object, comprising frame means, means supported from said frame means for holding an object to be wrapped, means for supporting a supply of tape from said frame means, said tape having an adhesive surface thereon, a roller disposed adjacent said object holding means and supported from said frame means, said tape passing from said supply supporting means over said roller with the tape adhesive surface out, means for supplying vacuum to at least a portion of the periphery of said roller to hold said tape against said roller, means for relatively shifting said object holding means laterally toward and away from said roller to impinge said object in a predetermined oriented position with respect to a lead end of said tape against the adhesive surface of said tape, means for rotating said holding means a predetermined integral number of half revolutions, means supported from said frame means for severing said tape between said object and said roller at the end of a wrapping operation and for advancing the severed end of the tape relative to said holding means whereby to provide an overlap of tape on a subsequent object, and drive means operatively connected to operate said rotating means, said lateral shifting means and said severing and advancing means in proper time relation.

4. A machine for wrapping tape on an object, comprising frame means, means supported from said frame means for holding an object to be wrapped in a predetermined position relative to a lead end of tape to be wrapped around said object, means for supporting a supply of tape from said frame means, said tape having an adhesive surface thereon, means for supporting said lead end of said tape adjacent said holding means with the adhesive surface thereof disposed toward said object, means for relatively shifting said object holding means laterally toward and away from said tape lead end supporting means to impinge said object against the adhesive surface of said tape, means for rotating said holding means to wrap the tape on said object, said tape being advanced by such rotation of said object, means for further advancing the tape relative to said holding means to produce an accurately predetermined amount of overlap of tape on said object, and drive means operatively connected to operate said rotating means, said lateral shifting means, and said tape advancing means in proper time relation.

5. A machine as set forth in claim 4 and further including means disposed adjacent said object holding means for severing a tape after it has been wrapped on an object, said severing means comprising said tape overlap means.

6. A machine for wrapping tape on an object, comprising frame means, means supported from said frame means for holding an object to be wrapped in a predetermined oriented position, said holding means requiring axial insertion of an object, means for supporting a supply of tape from said frame means, said tape having an adhesive surface thereon, means for guiding said tape from said supply supporting means toward said object supporting means with the adhesive surface of said tape disposed toward said object supporting means, means for moving said object supporting means laterally toward said tape guiding means to impinge the adhesive surface of a lead end of said tape against said object at a predetermined point on said object, said supporting means returning laterally to its initial position at the end of a cycle, means for thereafter rotating said object holding means a predetermined number of half revolutions, said predetermined number being more than two to wrap said tape on said object, drive means operatively connected to operate said rotating means and said tape impinging means in proper time relation, cycle starting means disposed adjacent said object holding means and operatively connected to drive means, axially depressible means on said holding means to sense the axial insertion of said object on said holding means and engageable axially with said cycle starting means to initiate a tape wrapping cycle, said cycle starting means being laterally deflectable and inoperative to start a cycle when engaged laterally.

7. A machine as set forth in claim 6 and further including means disposed adjacent said object holding means for severing the tape substantially at the end of a wrapping cycle, said severing means moving said tape forwardly about said object a predetermined distance after the end of a wrapping cycle to produce a predetermined amount of tape overlap, said severing means being operatively connected to said drive means.

8. A machine for wrapping tape on an object, comprising frame means, means supported from said frame means for holding an object to be wrapped in a predetermined oriented position with respect to said wrapping tape, means for supporting a supply of tape from said frame means, said tape having an adhesive surface thereon, means for guiding said tape from said supply supporting means to said object supporting means with the adhesive surface of said tape disposed toward said object supporting means, a lead end of said tape being positioned at a predetermined position on said object, means for relatively moving said tape toward said object supporting means to impinge the adhesive surface of said tape against said object, means for thereafter rotating said object holding means a predetermined number of half revolutions, said half revolutions being greater than two to wrap said tape on said object, drive means operatively connected to operate said rotating means and said tape impinging means in proper time relation, and means disposed adjacent said object holding means and operatively connected to said drive means to sense the presence of an object on said holding means and to initiate a tape wrapping cycle, said drive means comprising constantly operating power means, a clutch resiliently urged toward engagement, clutch opening means normally disengaging said clutch, solenoid means operatively connected to said clutch opening means and effective when operated to retract said clutch opening means for engaging said clutch, and electric means connected to said solenoid and controlled by said sensing means briefly to energize said solenoid to effect engagement of said clutch in response to the sensing of an object held by said holding means, said clutch opening means thereafter being effective to disengage said clutch after one revolution thereof.

9. A machine for wrapping tape on an object, comprising frame means, means supported from said frame means for holding an object to be wrapped in a predetermined oriented position with respect to said wrapping tape, means for supporting a supply of tape from said frame means, said tape having an adhesive surface thereon, means for guiding said tape from said supply supporting means to said object supporting means with the adhesive surface of said tape disposed toward said object supporting means, a lead end of said tape being positioned at a predetermined position on said object, means for relatively moving said tape toward said object supporting means to impinge the adhesive surface of said tape against said object, means for thereafter rotating said object holding means a predetermined number of half revolutions, said half revolutions being greater than two to wrap said tape on said object, drive means operatively connected to operate said rotating means and said tape impinging means in proper time relation, and means disposed adjacent said object holding means and operatively connected to said drive means to sense the presence of an object on said holding means and to initiate a tape wrapping cycle, said drive means comprising constantly operating power means, a normally disengaged clutch, solenoid means operatively connected to said clutch for engaging said clutch, and electric means connected to said solenoid and controlled by said sensing means to energize said solenoid to effect engagement of said clutch in response to the sensing of an object held by said holding means, said machine further including means normally engaging said clutch positively to hold said clutch disengaged and connected to said solenoid means for operation thereby, said electric connecting means including a switch closed by said sensing means and subsequently allowed to reopen to energize and then deenergize said solenoid, and thereby to retract said means positively holding said clutch disengaged, said last named means subsequently operating positively to disengage said clutch.

10. A machine as set forth in claim 9 wherein the sensing means comprises a member physically engaged by said object and moved thereby, and wherein the switch is engaged by said member.

11. A machine for wrapping tape on an object, comprising frame means, means supported from said frame means for receiving and holding an object to be wrapped in a predetermined oriented position with respect to said wrapping tape and being rotatable about an axis, means for supporting a supply of tape from said frame means, said tape having an adhesive surface thereon, means for positioning a lead end of said tape adjacent said holding means with the adhesive surface of said tape disposed toward said holding means, means for shifting said object holding means laterally of said axis toward said positioning means at the start of and away therefrom at the end of a wrapping operation to impinge said object in a predetermined position against the adhesive surface of said tape, means for rotating said holding means a predetermined number of half revolutions, said predetermined number being greater than two and less than about seven after impingement of said object against the adhesive surface of said tape to wrap said tape on said object, push means disposed adjacent said object holding means, spring means urging said push means axially out, said push means being engaged and moved axially in against said spring means by an object upon placement of said object on said holding means, a switch supported from said frame means, switch operating means on said switch axially movable to operate said switch and engaged by said push means when moved axially as an object is placed on said holding means to close said switch, said push means being mounted for axial movement relative to and for lateral movement with said holding means and being moved laterally with said holding means out of engagement with said switch operating means for reopening of said switch, said operating means including means laterally movable without effect on said switch and yielding upon engagement thereof from the side by said push means upon return thereof with said holding means at the end of a cycle, and drive means operatively connected to said rotating means and to said laterally shifting means, said drive means including a constantly operating power source and normally disengaged clutch means, said clutch means being electrically movable into engagement and wired to and controlled by said switch.

12. A machine for wrapping tape on an object, comprising frame means, means supported from said frame means for holding an object to be wrapped in a predetermined position with respect to said wrapping tape, whereby a lead end of said wrapping tape is positioned directly opposite a predetermined point on said object, means for supporting a supply of tape from said frame means, said tape having an adhesive surface thereon, means adapted to guide and position said tape to a station adjacent said object holding means with the adhesive surface of the tape disposed toward said object holding means, means for relatively shifting said object holding means laterally toward and away from said station to impinge said object against the adhesive surface of the tape, means for rotating said holding means a predetermined number of half revolutions, said half revolutions being more than two, means supported from said frame means for severing said tape between said station and said object at the end of a wrapping operation, said means advancing said tape a predetermined distance upon said object to be wrapped to produce a predetermined amount of tape overlap, and drive means operatively connected to operate said rotating means, said lateral shifting means, and said severing means in proper time relation, said drive means comprising a power source rotatable in only one direction, two-way rotatable coupling means connected thereto to produce a lateral shifting movement of said lateral shifting means, and one-way rotary drive means connected to said two-way means to rotate said object, said two-way drive means comprising a crank arm having a plurality of spaced apertures, a connecting rod pivotally connected thereto at one of said apertures, a gear segment connected to and rocked by said crank, and a pinion meshing with said gear segment and driven thereby, said pinion driving said object holding means, the particular aperture connection of said rod to said crank arm determining the amount of rotation of said rotating object.

13. A machine for wrapping tape on an object, comprising frame means, means supported from said frame means for holding an object to be wrapped in a predetermined oriented position with respect to said tape, means for supporting a supply of tape from said frame means, said tape having an adhesive surface thereon, means for guiding said tape from said supply and positioning the lead end of said tape adjacent said object holding means with the adhesive surface of the tape disposed toward said object at a predetermined point on said object, means for relatively shifting said object holding means laterally toward and away from said roller to impinge said object against the adhesive surface of said tape, means for rotating said holding means, severing means including a pair of opposed cooperating cutting edges disposed between said object holding means and said positioning means for advancing the tape a predetermined distance farther than the wrapping of said tape on said object to produce a predetermined amount of overlap of tape on said object and severing the tape at the end of a wrapping operation, and drive means operatively connected to operate said rotating means, said lateral shifting means, and said securing means in proper time relation.

References Cited by the Examiner

UNITED STATES PATENTS

| | | | |
|---|---|---|---|
| Re. 19,320 | 9/1934 | Purdy | 242—56.1 |
| 1,417,634 | 5/1922 | Scholin | 156—448 X |
| 2,142,777 | 1/1939 | Berry | 242—65 |
| 2,334,224 | 11/1943 | Socke | 156—446 |
| 2,392,148 | 1/1946 | Hornhostel | 242—65 |
| 2,412,508 | 12/1946 | Jensen | 242—54 |
| 2,414,603 | 1/1947 | Nelson. | |
| 3,073,008 | 1/1963 | McGraw | 242—56.1 X |
| 3,179,349 | 4/1965 | Aaron et al. | 242—65 |

MERVIN STEIN, *Primary Examiner.*

B. S. TAYLOR, *Assistant Examiner.*